Patented Dec. 23, 1952

2,623,077

UNITED STATES PATENT OFFICE 2,623,077

PREPARATION OF ALKALI METAL VINYLACETYLIDES

Willard J. Croxall, Bryn Athyn, and John O. Van Hook, Roslyn, Pa., assignors to Rohm & Haas Company, Philadelphia, Pa., a corporation of Delaware No Drawing. Application December 13, 1950, Serial No. 200,698

7 Claims. (Cl. 260—665)

This invention concerns a process for preparing alkali metal derivatives of vinylacetylene. This process comprises reacting an alkali metal amide with a dihalobutene.

Vinylacetylene has been prepared through exhaustive methylation of dimethylamino-2-butene and through polymerization of acetylene in the presence of a copper catalyst. It is known that alkali metal derivatives can be prepared from vinylacetylene. Vinylacetylene is not, however, a particularly desirable compound to make, handle, or store. Yet it is a useful precursor of many valuable types of compounds through formation of the alkali metal vinylacetylides and their reaction with aldehydes, ketones, carboxylic acids, esters of carboxylic acids, acid chlorides, nitriles, alkylene oxides, halohydrins, isocyanates, isothiocyanates, carbon monoxide or dioxide, sulfur dioxide, alkyl halides and sulfates, etc.

It is now found unnecessary to prepare vinylacetylene itself. Instead, the alkali metal derivatives thereof are made by reacting a dihalobutene, such as 1,4-dibromo-2-butene, 1,2-dibromo-3-butene, or mixtures of these butenes, or 1,4-dichloro-2-butene, 1,2-dichloro-3-butene, or mixtures thereof, or the like with an alkali metal amide. The reaction is most conveniently carried out by reacting a dihalobutene with an alkali metal amide in ammonia, the amide being formed in liquid ammonia and dihalobutene being added thereto. Alkali metal vinylacetylide can be obtained upon evaporation of excess ammonia. But for reaction of the alkali metal vinylacetylide separation is not necessary, since the reacting aldehyde, ketone, alkylene oxide, or the like can be added directly to the ammonia solution of vinylacetylide. After this latter reaction has been completed, the alkali metal can be taken up by addition of an ammonium salt of a strong acid, such as ammonium chloride. The reaction product can then be separated.

The reaction between metal amide and dihalobutene and subsequent reactions can be effected at —30° C. to —40° C. in liquid ammonia which is permitted to evaporate to leave the reaction product. This can be purified by extraction, distillation, or other suitable method. The reaction can also be carried out in the presence of inert anhydrous organic solvents such as ethyl ether, isopropyl ether, petroleum ether, or the like.

Typical examples of the formation of alkali metal vinylacetylides follow.

Example 1

In a reaction vessel equipped with a stirrer and low temperature thermometer there was placed one and a half liters of liquid ammonia to which 0.2 gram of ferric nitrate was added. There was dissolved in the ammonia two grams of sodium and air was passed into the solution until the blue color was discharged. There was then added over a period of 20 minutes 33 grams of sodium cut in small pieces. The ammonia was stirred for an hour, after which time the disappearance of blue color indicated conversion to sodamide. To this solution was added 63 grams of 1,4-dichloro-2-butene over a period of a half-hour. The resulting reaction mixture was stirred for three hours at —30° C. to —35° C. There was thus formed sodium vinylacetylide. Evaporation of a portion of ammonia solution left a solid which was this compound.

To the ammonia solution was added over a fifteen-minute period 29 grams of acetone. The resulting mixture was stirred for three hours with the temperature at —30° C. to —35° C. There were then added small portions of ammonium chloride to a total of 80 grams. The reaction mixture was allowed to warm up to room temperature with evaporation of ammonia. To the resulting solid mass there were added a liter of ethyl ether and 300 ml. of water. The ether layer was separated, dried over magnesium sulfate, filtered and distilled. There was obtained after removal of the ether a fraction of 21 grams of dimethyl vinylethynyl carbinol, distilling at 50°–53° C./10 mm. The refractive index of the fraction was 1.4738 at 20° C.

Example 2

In a similar manner there were reacted sodamide from 35 grams of sodium in excess liquid ammonia and 66 grams of a mixture of 1,4-dichloro-2-butene and 1,2-dichloro-3-butene with the temperature between —32° C. and —35° C. The mixture was stirred 1.5 hours to yield sodium vinylacetylide in solution in ammonia.

To demonstrate the reactivity of this compound as thus formed, ethylene oxide was passed as a gas into the ammonia solution, 29 grams being added thereto in 15 minutes. The reaction mixture was stirred four hours and then neutralized by the cautious addition of 80 grams of ammonium chloride in small portions. Ammonia was evaporated to give a solid to which water was added. This mixture was extracted with ether. The ether extract was separated, dried over sodium sulfate, and distilled. At 57°–60° C./8 mm. there was obtained a fraction which corresponded in composition to 5-hexene-3-yne-1-ol. It had a refractive index $n_D^{20}$ of 1.4950.

In place of sodium metal there can be used potassium or lithium or other members of this family. Dibromobutenes can be used in the place of dichlorobutenes.

We claim:

1. A process for preparing alkali metal derivatives of vinylacetylene which comprises reacting an alkali metal amide with a dihalobutene in liquid amonia at a temperature from about −30° C. to about −40° C.

2. A process for preparing alkali metal derivatives of vinylacetylene which comprises reacting an alkali metal amide in liquid ammonia with 1,2-dichloro-3-butene at a temperature from about −30° to about −40° C.

3. The process of claim 2 in which the alkali metal amide is sodium amide.

4. A process for preparing alkali metal derivatives of vinylacetylene which comprises reacting an alkali metal amide in liquid amonia with 1,4-dichloro-2-butene at a temperature from about −30° to about −40° C.

5. The process of claim 4 in which the alkali metal amide is sodium amide.

6. A process for preparing alkali metal derivatives of vinylacetylene which comprises reacting sodium amide in liquid ammonia with 1,4-dichloro-2-butene at a temperature between about −30° C. and −40° C.

7. A process for preparing alkali metal derivatives of vinylacetylene which comprises reacting sodium amide in liquid ammonia with 1,2-dichloro-3-butene at a temperature of about −30° C. to −40° C.

WILLARD J. CROXALL.
JOHN O. VAN HOOK.

REFERENCES CITED

The following references are of record in the file of this patent:

UNITED STATES PATENTS

| Number | Name | Date |
|---|---|---|
| 2,455,677 | Horeczy | Dec. 7, 1948 |

FOREIGN PATENTS

| Number | Country | Date |
|---|---|---|
| 618,189 | Great Britain | Feb. 17, 1949 |

OTHER REFERENCES

Bourguel: "Compt. Rendus," vol. 176 (1923), pp. 751–53.

Grignard: "Bull. Soc. Chim.," vol. 21 (1899), pp. 574–75.